G. M. RICHARDS.
PRESSURE GOVERNOR.
APPLICATION FILED JAN. 5, 1910.
1,082,821.
Patented Dec. 30, 1913.
3 SHEETS—SHEET 2.
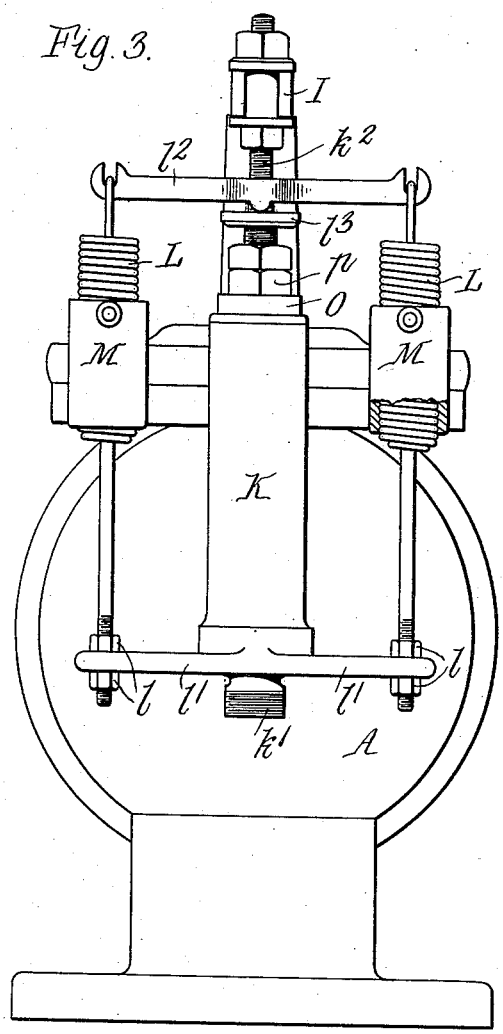
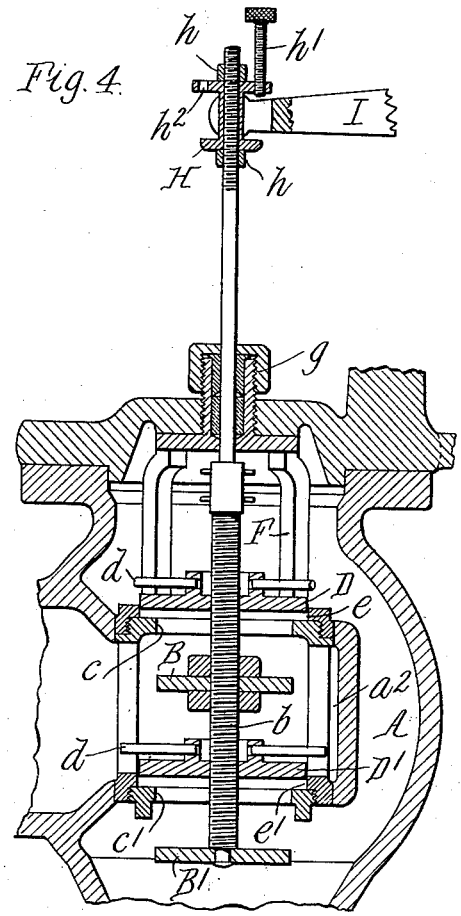
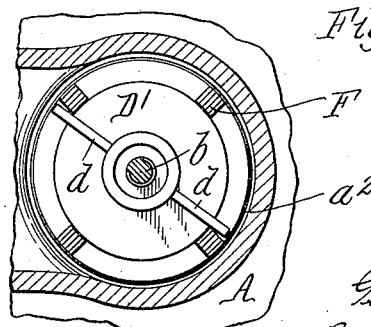
Witnesses.
A. T. Dimond
C. H. Bund.
Inventor.
George M. Richards,
By Wilhelm, Parker & Hand,
Attorneys.

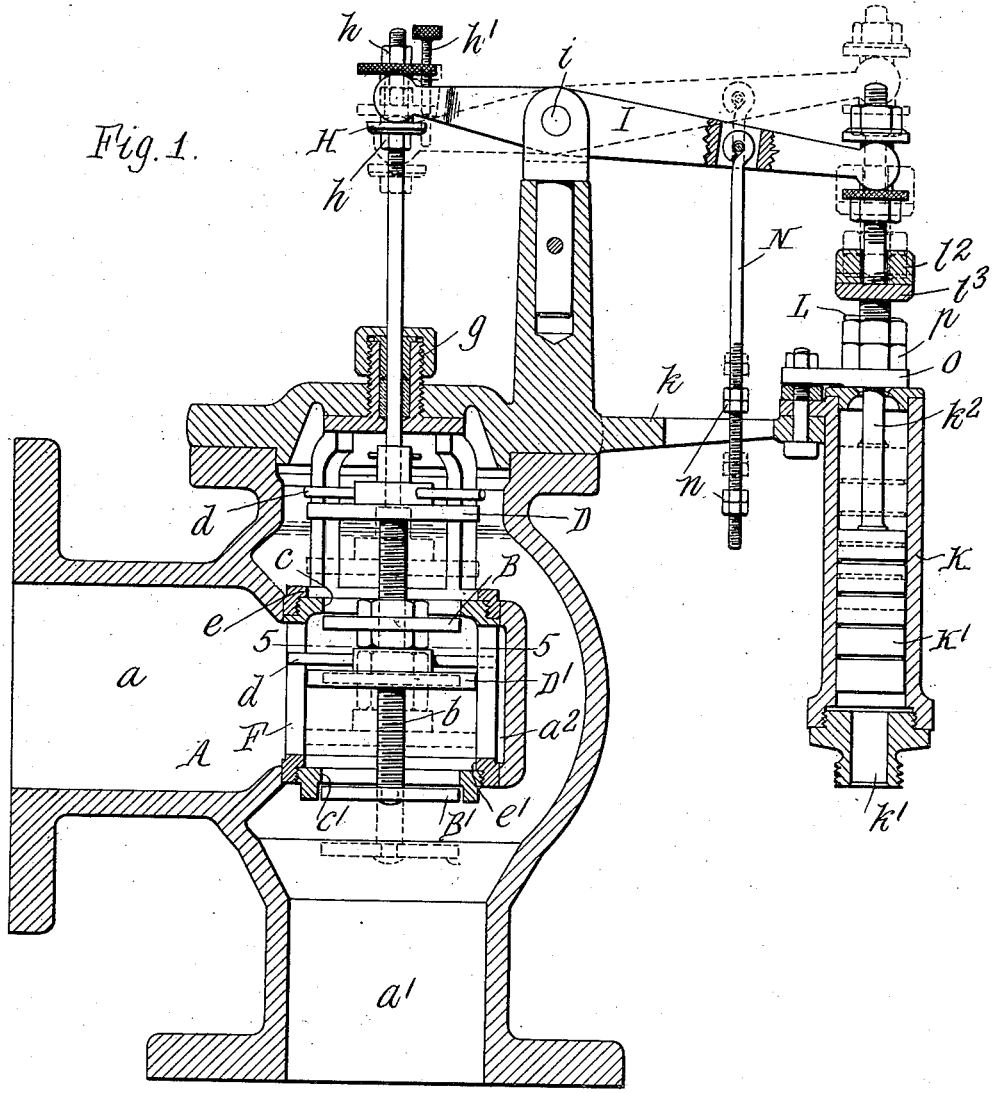

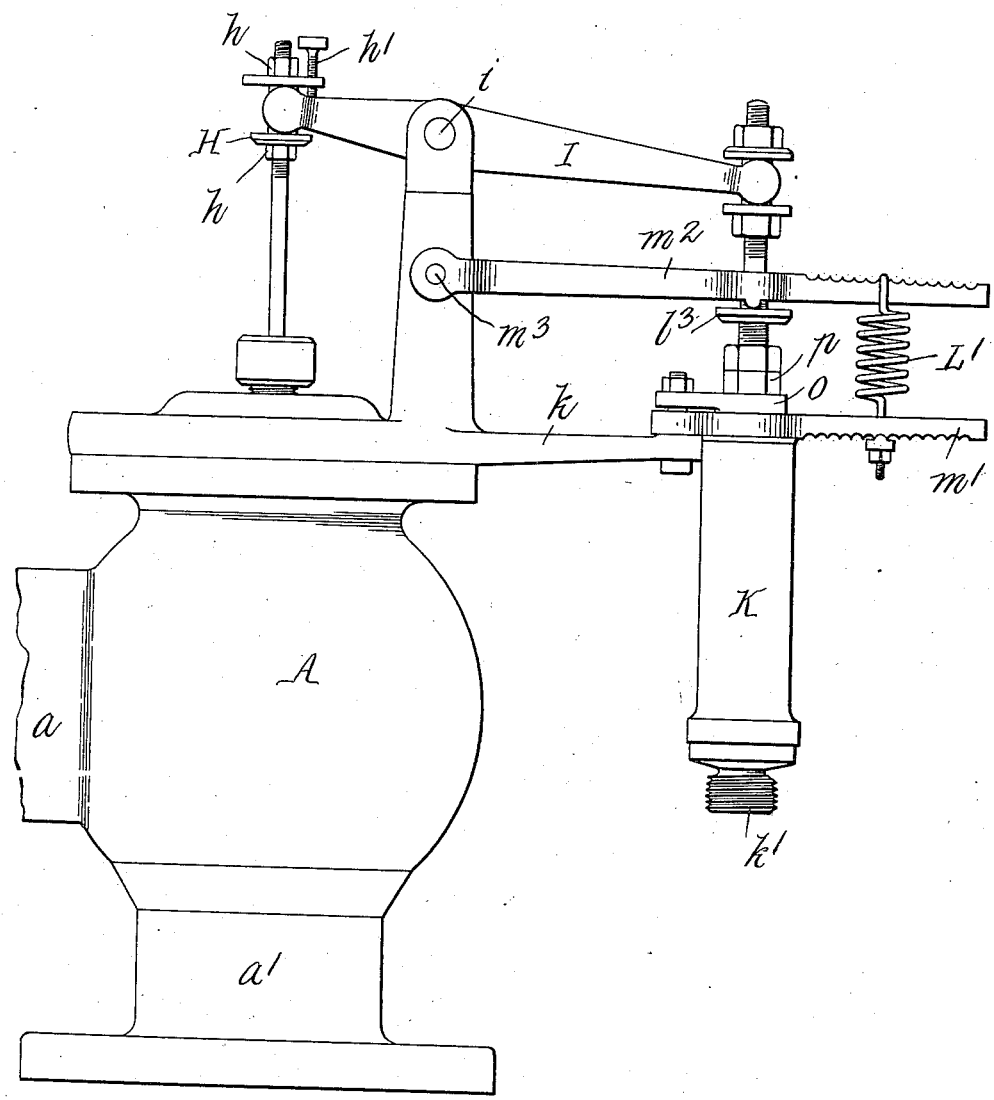

UNITED STATES PATENT OFFICE.

GEORGE M. RICHARDS, OF ERIE, PENNSYLVANIA, ASSIGNOR TO MARION A. RICHARDS, OF ERIE, PENNSYLVANIA.

PRESSURE-GOVERNOR.

1,082,821. Specification of Letters Patent. Patented Dec. 30, 1913.

Application filed January 5, 1910. Serial No. 536,508.

*To all whom it may concern:*

Be it known that I, GEORGE M. RICHARDS, a citizen of the United States, residing at Erie, in the county of Erie and State of Pennsylvania, have invented a new and useful Improvement in Pressure-Governors, of which the following is a specification.

This invention relates more particularly to improvements in pressure governors of that sort which automatically govern the supply of steam, or other motive fluid, to air compressor or pumping engines in such manner as to maintain a desired practically uniform speed of the engine, notwithstanding fluctuations in the pressure of the pumped fluid and consequently in the load on the engine, until a predetermined pressure is attained, and then regulate the speed of the engine in accordance with the consumption of the pumped fluid to maintain the pumped fluid substantially at such predetermined pressure.

One object of the invention is to produce an efficient and practical pressure governor of this sort which operates to first increase and then decrease the supply of steam to the engine by a simple movement of the valve and its operating piston or motor in one direction.

Other objects of the invention are to enable the valve to be quickly and easily set in an initial position such as to give just enough steam to the engine for the normal speed of the compressor when it is running light and to be readily adjusted to maintain any desired pressure of the pumped fluid; and also to improve the construction of pressure governors in the respects hereinafter described and set forth in the claims.

In the accompanying drawings, consisting of two sheets: Figure 1 is a sectional elevation of a pressure governor embodying the invention, showing the parts in their normal position. Fig. 2 is an enlarged plan of the adjustable connection between the valve stem and its operating lever. Fig. 3 is a side elevation of the governor. Fig. 4 is a fragmentary sectional elevation thereof similar to Fig. 1 but showing a different adjustment of the parts. Fig. 5 is a fragmentary plan thereof in line 5—5, Fig. 1. Fig. 6 is an elevation showing means of modified construction for changing the stroke of the valve.

Like reference characters refer to like parts in the several figures.

The governor is especially suited for use with steam engines for driving air compressors, and for the sake of clearness the terms "steam" and "air" are used in this specification to designate respectively the motive fluid for the engine and the pumped fluid but the improvements are not restricted in application to governors for such use, but are applicable to governors for pumps for other fluids and liquids whether operated by steam or other motive fluid.

A represents a valve casing of a construction commonly used for balanced steam valves, having inlet and outlet openings $a$ and $a'$ respectively, and an inner chamber $a^2$ which connects with one of these openings and has opposite inlet openings connecting the inner and outer chambers. The valve casing is located in the steam supply pipe leading to the compressor engine, and a balanced steam valve comprising two connected inlet disks B and B' which coöperate with seats $c$ and $c'$ in the opposite inlet openings of the casing, controls the supply of steam to the engine. The disks B and B', which, for convenience, are herein called "inlet" disks, are fixed in any suitable manner to a valve rod or body $b$ at the proper distance apart. The valve is also provided with two disks D and D', hereinafter called "governing" disks, which are arranged in corresponding relation respectively to the inlet disks B and B' and are adjustable on the valve rod $b$ to place them nearer to or farther from their companion inlet disks. Preferably the valve rod is externally screwthreaded and works in threaded central holes in the governing disks, and arms $d$, which project from the hubs of these disks and slidably engage parts in the valve casing, prevent the disks from turning in the casing, so that the governing disks can be adjusted toward or from their companion inlet disks by turning the valve rod in one or the other direction. The governing disks are preferably larger in diameter than the inlet disks and coöperate with separate seats $e$ and $e'$ respectively in the opposite inlet openings of the casing.

In the normal position of the valve shown in Fig. 1, the inlet disks B B' are near their seats $c\ c'$ at one side thereof, while the governing disks D D' are at some distance from the opposite sides of their seats $e\ e'$, so that during the first portion of the movement of the valve in one direction, i. e., downwardly in the construction shown, the inlet openings will be opened wider to increase the supply of steam to the engine until a predetermined maximum opening is attained, after which in the continued movement of the valve in the same direction the governing disks by approaching their seats will decrease the size of the inlet openings and reduce the supply of steam to the engine. The governing disks can be caused to commence to decrease the steam supply after the valve has been opened to any desired maximum extent by adjusting the governing disks nearer to or farther from the inlet disks. The valve seats $c\ c'$ and $e\ e'$ are preferably formed by seat rings on a brass cage or skeleton frame F which is made a sliding fit in the opposite inlet openings of the inner chamber $a^2$ of the valve casing. When the steam is turned on, the brass cage expands more than the casing, which is of iron, thus making steam tight joints between the seat rings and the casing. This is a desirable construction as it obviates the necessity for the screw or driven connections ordinarily required for the seat cage, but valve seats can be provided in the casing in any other suitable way.

The rod or stem $b$ of the governor valve extends through a suitable stuffing box $g$ at the upper end of the casing and has an adjustable connection H with one end of a lever I which is suitably fulcrumed at $i$ and is connected at its other end in any suitable way to the rod of the piston, or movable part of a motor K actuated by the compressed air for operating the valve.

The connection H preferably consists of a flanged spool screwed on the threaded upper end of the valve stem and embraced by the forked end of the lever I. The spool is adapted to be stationarily secured in adjusted positions on the valve stem by jam nuts $h$ at opposite ends of the spool. A screw $h'$ inserted in one of a series of threaded holes $h^2$, Fig. 2, in one flange of the spool and extending into the forked end of the lever I prevents the valve stem from turning. By withdrawing this screw $h'$ from engagement with the lever the threaded valve rod $b$ can be turned by means of the spool H as a handle to screw the governing disks D D' up or down on the valve rod toward or from their companion inlet disks B B', and by loosening the jam nuts $h$ the spool can be screwed up or down on the valve stem to adjust the initial position of the inlet disks B B' relative to their seats. Any other suitable connection between the valve and the lever I permitting the described adjustments of the valve and the governing disks can be used.

The motor for operating the valve may be of any suitable construction. In the construction shown in Figs. 1–4, it consists of a cylinder K supported by an arm $k$ projecting from the valve casing and provided with an inlet connection $k'$ for compressed air from the receiver, or other source supplied by the compressor, and a piston K' which is moved upwardly in the cylinder by the air, and to the rod $k^2$ of which, the lever I is connected. The upward movement of the piston, by the compressed air, is opposed by springs L L, Fig. 3, arranged at opposite sides of the cylinder and adjustably connected at their lower ends by nuts $l$ to arms $l'$ projecting from the lower end of the cylinder, and at their upper ends to a yoke $l^2$ having lugs at its middle portion which bear on a nut $l^3$ which is adjustable on a screw-threaded part of the piston rod. By means of these adjustable connections the initial position of the motor piston and valve can be changed as required, with or without varying the tension of the springs L, or the tension of the springs can be regulated to give a required resistance in the initial position of the valve.

M represents internally-threaded sleeves which are screwed on the coil springs L. By screwing these sleeves farther onto or off of the springs, the extensibility or operative length of the springs is decreased or increased accordingly, so as to secure a shorter or longer stroke or movement of the governor piston and valve under a given air pressure and spring resistance on the piston. The adjustment of these sleeves does not change the initial position of the valve or the spring resistance to its movement.

N represents a rod connected to the governor lever I and provided with adjustable stops or nuts $n\ n$ adapted to strike the cylinder supporting arm $k$, or other part, to limit the opening and closing movements of the valve as desired.

O, Fig. 1, represents the normal speed stop which is pivoted on the upper end of the governor cylinder so that its free end can be swung under an adjustable nut $p$ on the piston rod to arrest the downward movement of the piston when the valve is in the normal position shown in Fig. 1. This stop can be swung out to allow the piston to descend farther and completely close the valve to stop the compressor. These adjusting means for the springs and the normal speed stop O are not claimed herein but form the subject of claims in a copending application.

In the use of the governor, the spool H is loosened and screwed up or down on the valve stem, as explained, to set the inlet disks in an initial position such as to give just enough steam for the normal speed of the compressor when it is running light. The motor piston will be raised higher and higher and open the valve wider as the pressure of the compressed air builds up. When the desired pressure is attained the screw $h'$ in the spool H is withdrawn and the spool and valve stem are turned to move the governing disks D D' toward their seats, as explained, until the compressor begins to slow down and the screw $h'$ is then replaced in one of the holes in the spool so as to enter the forked end of the lever I to prevent further rotation of the spool. Any further increase in the air pressure and upward movement of the motor piston will then reduce the supply of steam to the engine by reason of the governing disks D D' approaching nearer to their seats, while a decrease in air pressure will cause a reverse movement of the motor piston and valve and increase the supply of steam to the engine, thereby maintaining a practically constant predetermined pressure of the air.

Fig. 6 shows a governor having different means for varying the stroke of the piston and valve under a given air pressure. In this construction a spring $L'$ is connected at its lower end to a fixed arm $m'$ and at its upper end to the arm of a forked lever $m^2$ which is fulcrumed at $m^3$ and bears on the adjustable nut $l^3$ on the rod of the governor piston. By adjusting the spring nearer to or farther from the piston rod its leverage on the piston will be changed and a given air pressure will produce a proportionately shorter or longer stroke of the piston and steam valve.

I claim as my invention:

1. In a pressure governor for pumps, a valve which is actuated by the pumped fluid for controlling the supply of motive fluid to the pump, and comprises two parts which move together, one of which parts enlarges the passage for the motive fluid during an initial movement of the valve in one direction, and the other of which parts reduces the passage for the motive fluid during the continued movement of the valve in the same direction after such initial movement, and means for adjusting one of said parts relatively to the other without removing the valve from the valve casing, substantially as set forth.

2. In a pressure governor for pumps, a balanced valve which is actuated by the pumped fluid for controlling the supply of motive fluid to the pump, and comprises two inlet disks and two governing disks which move together, said inlet disks acting to enlarge the passage for the motive fluid during an initial movement of the valve in one direction, and said governing disks acting to reduce the passage for the motive fluid during the continued movement of the valve in the same direction after such initial movement, and means located exterior of said valve for adjusting said governing disks relatively to said inlet disks, substantially as set forth.

3. In a pressure governor for pumps, the combination of a valve which is actuated by the pumped fluid for controlling the supply of motive fluid to the pump and comprises an inlet disk and a governing disk which move together and are relatively adjustable, a valve casing having seats for said disks so arranged that the movement of said valve in one direction moves said inlet disk away from its seat and moves said governing disk toward its seat, and means located externally of said valve casing for effecting the relative adjustments of said disks, substantially as set forth.

4. In a pressure governor for pumps, the combination of a balanced valve which is actuated by the pumped fluid for controlling the supply of motive fluid to the pump and comprises two inlet disks and two governing disks which are movable together, a valve casing having seats for said inlet and governing disks, said inlet and governing disks being arranged at opposite sides of their respective seats whereby the inlet disks move away from their seats and the governing disks move toward their seats during the movement of the valve in one direction, and means located exterior of said valve for adjusting said governing disks relatively to said inlet disks, substantially as set forth.

5. In a pressure governor for pumps, the combination of a valve which is actuated by the pumped fluid for controlling the supply of motive fluid to the pump and comprises an inlet disk and a governing disk which move together, a valve casing having seats for said disks arranged so that the movement of said valve in one direction moves said inlet disk away from its seat and moves said governing disk toward its seat, and a valve rod operatively connected with said governing disk for adjusting it relative to said inlet disk, substantially as set forth.

6. In a pressure governor for pumps, the combination of a valve which is actuated by the pumped fluid for controlling the supply of motive fluid to the pump and comprises a rod, an inlet disk fixed on said rod, and a governing disk which has a screw connection with said rod, a valve casing having seats at the opposite sides of which said disks are located, and means for holding said governing disk from turning whereby said governing disk is adjusted relative to said inlet disk by turning said valve rod, substantially as set forth.

7. In a pressure governor for pumps, the combination of a motor actuated by the pressure of the pumped fluid, a valve for controlling the supply of motive fluid to the pump comprising a rod, an inlet disk and a governing disk carried by said rod, an operative connection between said rod and one of said disks for relatively adjusting the disks by turning the rod, and connections between said valve rod and said motor for adjusting said rod rotatively and lengthwise, substantially as set forth.

8. In a pressure governor, the combination with a steam valve casing and a balanced valve therein, of a seat cage made of metal having a greater coefficient of expansion than said casing and having a sliding fit in the casing, whereby the cage can be inserted into the casing and will be expanded therein to form tight joints with the casing, said seat cage having a plurality of rings connected and held in fixed relation to each other by parts of the cage, substantially as set forth.

9. In a pressure governor for pumps, the combination of a valve which is actuated by the pumped fluid for controlling the supply of motive fluid to the pump and which has parts which are adapted to increase and decrease the valve passage by a movement of the valve in one direction, a valve stem on which all of said parts are mounted, and means for enabling the parts of the valve to be adjusted relatively to each other from the exterior of said casing to reduce the valve passage for the motive fluid at any desired point in the stroke of the valve by turning said valve stem, substantially as set forth.

10. In a pressure governor for pumps, the combination of a valve, a motor actuated by the pumped fluid for operating the valve to control the supply of motive fluid to the pump, a spring for resisting the movement of the movable parts of the motor and the valve, and means for adjusting the spring to vary the resistance of the spring to the movement of said movable parts, said spring, when adjusted for any resistance, offering substantially the same initial resistance to the movement of said movable parts, substantially as set forth.

11. In a pressure governor for pumps, the combination of a motor actuated by the pumped fluid, a valve which is actuated by said motor and which by a movement in one direction first increases and then decreases the valve opening for the motive fluid, a spring for resisting the movement of the movable parts of the motor and the valve, and means for adjusting the spring to vary the resistance of the spring to the movement of said movable parts, said spring, when adjusted for any resistance, offering substantially the same initial resistance to the movement of said movable parts, substantially as set forth.

Witness my hand, this 29th day of December, 1909.

GEORGE M. RICHARDS.

Witnesses:
 GEORGE T. HILL,
 CHAS. H. SPENCER.

Copies of this patent may be obtained for five cents each, by addressing the "Commissioner of Patents, Washington, D. C."